United States Patent
Liu

(10) Patent No.: US 10,274,399 B2
(45) Date of Patent: Apr. 30, 2019

(54) GEAR DYNAMIC TRANSMISSION ERROR DETERMINATION

(71) Applicant: YANCHENG INSTITUTE OF TECHNOLOGY, Yancheng, Jiangsu Province (CN)

(72) Inventor: Fuhao Liu, Yancheng (CN)

(73) Assignee: YANCHENG INSTITUTE OF TECHNOLOGY, Yancheng (CN)

( * ) Notice: Subject to any disclaimer, the term of this patent is extended or adjusted under 35 U.S.C. 154(b) by 263 days.

(21) Appl. No.: 15/319,228

(22) PCT Filed: Jan. 5, 2016

(86) PCT No.: PCT/CN2016/070104
§ 371 (c)(1),
(2) Date: Dec. 15, 2016

(87) PCT Pub. No.: WO2016/110236
PCT Pub. Date: Jul. 14, 2016

(65) Prior Publication Data
US 2017/0138819 A1    May 18, 2017

(30) Foreign Application Priority Data
Jan. 5, 2015    (CN) .......................... 2015 1 0003696

(51) Int. Cl.
G01M 13/02    (2019.01)

(52) U.S. Cl.
CPC .................... *G01M 13/02* (2013.01)

(58) Field of Classification Search
USPC ............................ 73/115.01, 115.02, 115.06
See application file for complete search history.

(56) References Cited

FOREIGN PATENT DOCUMENTS

| CN | 101246083 | 8/2008 |
|---|---|---|
| CN | 101271038 | 9/2008 |
| CN | 102519723 | 6/2012 |
| CN | 103698124 | 4/2014 |
| CN | 104502096 | 4/2015 |
| JP | H0933398 | 2/1997 |

OTHER PUBLICATIONS

International Search Report filed in PCT/CN2016/070104 dated Feb. 29, 2016.

*Primary Examiner* — Eric S. McCall
(74) *Attorney, Agent, or Firm* — Rankin, Hill & Clark LLP

(57) ABSTRACT

Determining a gear dynamic transmission error may include calculating a collision time interval via parameter values, such as an angular velocity of an input shaft measured by an angle coder, a drag torque of an output shaft provided by a magnetic powder brake, a gear backlash, and angular displacements of the input shaft and the output shaft and comparing a relative displacement contained with the gear backlash, until a value of the relative displacement of the comparison falls within an appropriate interval and meets requirements. In this way, a transmission error with relatively high accuracy may be obtained.

5 Claims, 4 Drawing Sheets

GEAR DYNAMIC TRANSMISSION ERROR DETERMINATION

TECHNICAL FIELD

The present invention relates to the field of machine manufacturing and controlling, and more particularly, to a method for determining a dynamic transmission error of a gear, while considering a gear backlash.

BACKGROUND

In all mechanical drive, gear transmission has characteristics of steady drive, accuracy of drive ratio, high efficiency, long service life or the like, so that the gear transmission becomes the most important and widely used mechanism transmission High speed steady and precise gear transmission is a national key scientific and technological project. A transmission error has been widely accepted and considered as an excitation source for vibration and noise of a gear system because the transmission error affects force and velocity changes in the gear transmission. At the same time, the gear dynamic transmission error is also a very important part in gear testing, so that accurate testing and calculation of the transmission error are of great significance to gear manufacturing and the researches on gear dynamics.

The State Intellectual Property Office of the People's Republic of China disclosed a patent documentation on 1 Oct. 2008, with a Publication Patent No. of CN101275881, and titled Small Mode Number Gear transmission Error Measuring Method, including the steps of firstly connecting a measured gear, a driver, a first goniometric coder, a first shaft joint and a first electric motor in successive, then connecting a measuring gear, a flexible shaft joint, a second goniometric coder, a second shaft joint and a second electric motor in successive, the measured gear and the measuring being meshed in a single side and being driven by the two electric motors respectively, detecting an angular displacement $\phi 2$ of the measuring gear relative to the second goniometric coder, an angular displacement $\phi 1$ of a measuring gear shaft system and an angular displacement $\phi'$ of a measured gear shaft system, and obtaining a transmission error of a small mode number gear after calculation. However, due to gear machining errors, installation errors, lubrication, modification and other factors, an offset of a tooth profile surface relative to an ideal tooth profile position will lead to a gear backlash (FIG. 1), so that positions of a meshing-in point and a meshing-out point will deviate from a theoretical meshing point when the gear is meshed in or meshed out, to produce corner meshing and cause a collision impact between meshing gear surfaces. Such collision impact plays a key role in smoothness and accuracy of high-speed gear transmission. For accuracy drive, trace idle stroke and impact occur during positive and reverse rotating, which affect the drive accuracy. Obviously, the gear backlash directly affects a gear system to obtain the transmission error. However, the influence of the gear backlash on the transmission error is not considered in this solution, so that a larger deviation will occur between a final calculation result and an actual value.

At the same time, the numerical calculation of the transmission error of the gear system becomes an increasingly prominent problem. At present, transmission error calculation methods stay in the traditional methods, such as: a Newmark integral method, a Runge-Kutta integral method, a Gear method and an improved Gear method (Wstiff method and Dstiff method). The above calculation methods have different emphasis on the transmission error calculation methods. Some methods focus more on grasping the calculation accuracy; while some methods have a faster calculation velocity. The traditional calculation methods usually fail to control the distribution of calculation time and calculation accuracy perfectly, often bring an enormous calculation quantity in case that the accuracy requirement is higher, resulting in a long calculation time; and will decrease the calculation accuracy in case of guaranteeing the calculation time, so that the transmission error of the gear system cannot be described and forecasted correctly.

SUMMARY

The present invention mainly solves a technical problem of the prior art that a transmission error is measured inaccurately due to a gear backlash during actual measurement, and a problem of it being difficult to balance a calculation accuracy and a calculation time by calculating a gear dynamic transmission error through theoretical simulation. Under the premise of taking the influence of the gear backlash on the transmission error into consideration, a calculation method that combines the actual measurement with the theoretical simulation and can quickly calculate the gear dynamic transmission error in a case of guaranteeing certain calculation accuracy is proposed.

The above technical problems are mainly solved by the present invention through the following technical solutions: a method for determining dynamic transmission error of gear includes the following steps of:

A. obtaining parameter values, the parameter values including an angular velocity of an input shaft measured by an angle coder and a drag torque of an output shaft provided by a magnetic powder brake;

B. calculating a collision time interval $\Delta t_i$ between two gear teeth;

C. comparing the collision time interval $\Delta t_i$ with a time-step $\Delta t$, performing step D if $\Delta t$ is less than $\Delta t_i$; and performing step G if $\Delta t$ is greater than or equal to $\Delta t_i$;

D. calculating a relative displacement of gear $x(n+1)$ by taking the time-step $\Delta t$ as a step, if an absolute value $|x(n+1)|$ of the relative displacement $x(n+1)$ is less than or equal to a gear backlash L, performing step J; and if the absolute value $|x(n+1)|$ of the relative displacement $x(n+1)$ is greater than the gear backlash L, decreasing the time-step $\Delta t$ and then performing step E. comparing the time-step $\Delta t$ with a minimum time-step $t_{min}$, performing step D if the time-step $\Delta t$ is greater than or equal to the minimum time length $t_{min}$; and performing step F if the time-step $\Delta t$ is less than the minimum time-step $t_{min}$;

F. calculating a relative displacement $t_{min}$ by taking the minimum time-step $x(n+1)=L \, \text{sign}(\dot{x}(t(n)))$ as a step, $\dot{x}(n+1)=0$, and then performing step J;

G. calculating the relative displacement $x(n+1)$ by taking the collision time interval $\Delta t_i$ as the step, if an absolute value $|x(n+1)|$ of the relative displacement $x(n+1)$ is less than or equal to $L-\varepsilon$, performing step J; if the absolute value $|x(n+1)|$ of the relative displacement $x(n+1)$ is less than or equal to $L+\varepsilon$ and the absolute value $|x(n+1)|$ of the relative displacement $x(n+1)$ is greater than $L-\varepsilon$, performing step I; and if the absolute value $|x(n+1)|$ of the relative displacement is greater than $L+\varepsilon$, decreasing the collision time interval $\Delta t_i$, and then performing step H;

H. comparing the collision time interval $\Delta t_i$ with the minimum time-step $t_{min}$, if the collision time interval $\Delta t_i$ is greater than or equal to the minimum time-step, returning to step G; if the collision time interval $\Delta t_i$ is less than the minimum time-step $t_{min}$, taking the minimum time-step as the step, i.e., $t(n+1)=t(n)+t_{min}$, and then performing step I;

I. calculating the relative displacement $x(n+1)=L$ sign($\dot{x}(t(n))$), increasing the number of the step n by 1, then taking a collision time constant $\in_{\Delta t}$ as a step, i.e., $t(n+1)=t(n)+\in_{\Delta t}$, calculating a relative velocity as: $\dot{x}(n+1)=-e\dot{x}(n)$, calculating the relative displacement as: $x(n+1)=x(n)$, and then performing step J; and J. judging whether $tx(n+1)$ is greater than $M \times T_f$, if yes, finishing calculation, and if not, increasing the number of step n by 1 and then returning to step B;

ε being a minimum error, M is a number of the period, $T_f$ being a period of the excitation, $t(n)$ being a $t(n)^{(th)}$ time sampling point, and $x(n)$ being an $n^{(th)}$ relative displacement, if an original point being located above a sign, it representing a derivation for time, one original point representing a first-order derivative, two original points representing second-order derivative, and sign being a sign function. The relative displacement of gear $x(n+1)$, relative velocity $\dot{x}(n+1)$ and time $tx(n+1)$ of the M periods finally obtained can reflect the gear dynamic transmission error preferably. Through the transmission error obtained, the accuracy of a gearbox may be evaluated.

When measuring the actual gear set, various parameter values are measured in a conventional manner or set by a user, during analogue simulation calculation, the parameter values are manually set or automatically set by a computer. The parameter values include L, ε, $T_f$, $R_{bg}$, $R_{bp}$, $\theta_g$, $\theta_p$, the mean value of the external load moment, the rotational inertia of the driven wheel, the fluctuation portion of the external load moment, ω, $t_0$, the meshing stiffness at the front and lateral sides of the gear pair caused by the oil film, and the meshing damping at the front and lateral sides of the gear pair caused by the oil film, or the like.

Preferably, calculation of the collision time interval in step B is performed as follows:

$$\Delta t_i = \frac{-b \pm \sqrt{b^2 - 4ac}}{2a},$$

wherein, $a=(R_{bg}T_m+R_{bg}T_p \cos(\omega t_g)-R_{bg}kx(t_0)-R_{bg}c\dot{x}(t_0))/2$, $b=\dot{x}(t_g)$, $c=x(t_0)-L$ sign($\dot{x}(t_0)$), $\Delta t_i$ is a minimum positive real value of two values, $R_{bg}$ is a base radius of a driven wheel, $R_{bp}$ is a base radius of a driving wheel, $T_m$ is a ratio of a mean value of an external load moment to a rotational inertia of the driven wheel, $T_p$ is a ratio of a fluctuation portion of the external load moment to the rotational inertia of the driven wheel, ω is a frequency of the external load moment, $t_0$ is an initial system time, k is a ratio of a sum of meshing stiffness at front and lateral contact sides of a gear pair caused by an oil film to the rotational inertia of the driven wheel, and c is a ratio of a sum of meshing damping at the front and lateral contact sides of the gear pair caused by the oil film to the rotational inertia of the driven wheel.

Preferably, $\Delta t_i < \Delta t$ is directly judged so that step G performed (i.e., the performing step G if $\Delta t$ is greater than or equal to $\Delta t_i$ described in step C) if $\Delta t_i$ has no positive real value while calculating the collision time interval $\Delta t_i$.

Preferably, a specific operation of decreasing the time-step in step D is decreased $\Delta t^2$ from $\Delta t$.

Preferably, a specific operation of decreasing the collision time interval in step D is decreased $\Delta t_1^2$ from $\Delta t_i$.

Substantial effects brought by the present invention are that the influence of the gear backlash on the transmission error is considered, and the calculation time is reduced as much as possible in the case of guaranteeing certain calculation accuracy, so that more preferable distribution of the calculation accuracy and calculation time is realized.

in figures: 1 refers to electric motor, 2 refers to pinion gear; 3 refers to input shaft; 4 refers to angle coder; 5 refers to large gear; 6 refers to output shaft; and 7 refers to magnetic powder brake.

DETAILED DESCRIPTION

The technical solutions of the present invention will be further described hereinafter with reference to the embodiments and the drawings.

Figure 2:
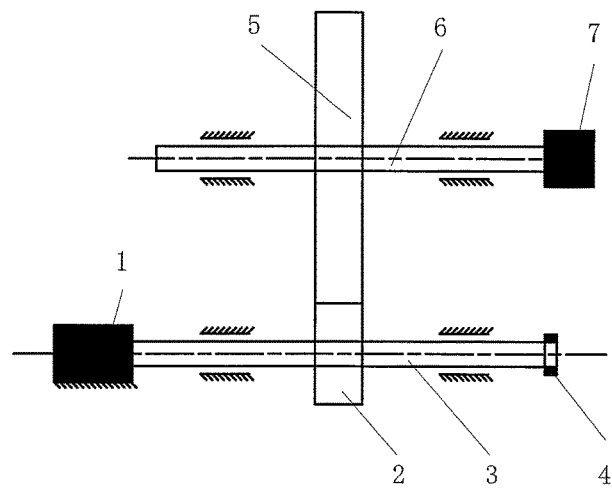
FIG. 2 is a schematic diagram of a parameter measurement system of the present invention.
Figure 3:
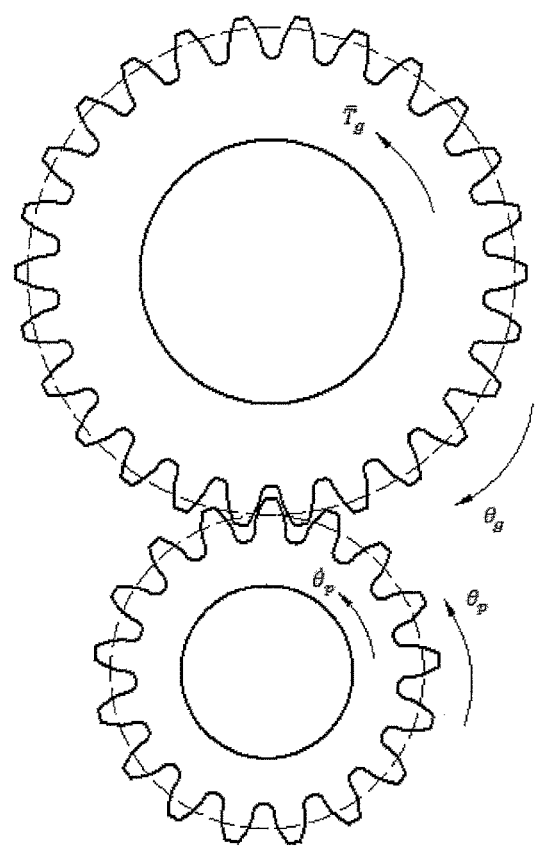
FIG. 3 is a schematic diagram of assembling a driving wheel and a driven wheel according to a standard center distance of the present invention.

Embodiment: FIG. 2 is a system for measuring an actual gear set, which includes a motor 1, a driving gear 2, an input shaft 3, an angular coder 4, a driven wheel 5, an output shaft 6 and a magnetic powder brake 7. The driving wheel 2 and the driven wheel 5 are assembled according to a standard center distance, as shown in FIG. 3.

Figure 1:
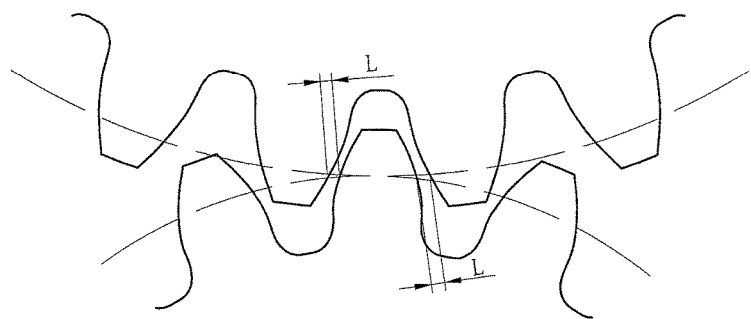
FIG. 1 is an enlarged drawing of a gear meshing area of the present invention.

FIG. 1 is an enlarged drawing of a gear meshing area.

A transmission error (relative displacement) of a gear is a difference value between a position of a tooth profile on the driven wheel measured along a direction of a meshing line and related to drive characteristics during actual meshing and a position where the tooth profile should be located under an ideal condition, which may be defined as follows:

$$x(t)=R_{bp}\theta_p(t)-R_{bg}\theta_g(t) \qquad (1)$$

wherein, $R_{bg}$ is a base radius of the driven wheel, $R_{bp}$ is a base radius of the driving wheel, $\theta_g$ is an angular displacement of the driven wheel, $\theta_p$ is an angular displacement of the driving wheel, and the angular displacement may also be measured by the angular coder.

Angular coder: measuring the angular velocity $\dot{\theta}_p$ of the input shall in FIG. 2;

Magnetic powder brake: providing a drag torque for the output shaft, wherein the drag torque is:

$$T_g=T_m+T_p \cos(\omega t) \qquad (2)$$

wherein, $T_m$ and $T_p$ are the mean value of the external load moment and the moment of the fluctuation portion respectively; ω is a frequency of the drag torque.

When $|x(t)|<L$, a dynamic equation of the gear system is established according to the Alembert principle:

$$I_g\ddot{\theta}_g(t)-(c_1+c_2)\dot{x}(t)-(k_1+k_2)x(t)=-\overline{T}_g \qquad (3)$$

wherein, $I_g$ is a rotational inertia of a large gear; $k_1$ and $c_1$ are meshing stiffness and meshing damping at the front contact side of the gear pair caused by the oil film respectively; and $T_m$ and $T_p$ are the mean value of the external load moment and the moment of the fluctuation portion respectively. Both sides of the Formula (3) are divided by the rotational inertia $I_g$ at the same time to obtain:

$$\ddot{\theta}_g(t) - e\dot{x}(t) = -T_m - T_p \cos(\omega t) \tag{4}$$

Here, $c=(c_1+c_2)/I_g$, $k=(k_1+k_2)/I_g$, $T_m=T_m/I_g$ and $T_p=T_p/I_g$. According to formula (4), it can be obtained:

$$\ddot{\theta}_x(t) = c\dot{x}(t) + kx(t) - T_m - T_p \cos(\omega t) \tag{5}$$

From time $t_0$ to time $t$, the angular velocity and the angular displacement of the big gear wheel may be obtained by performing integral on the formula (5).

$$\dot{\theta}_g(t) = \dot{\theta}_g(t_0) - T_m(t-t_0) - T_p \frac{\sin(\omega t) - \sin(\omega t_0)}{\omega} + \tag{6}$$
$$c(x(t)-x(t_0)) + k\left(x(t_0)(t-t_0) + \dot{x}(t_0)\frac{(t-t_0)^2}{2}\right)$$

$$\theta_g(t) = \theta_g(t_0) + \dot{\theta}_g(t_0)(t-t_0) - T_m\frac{(t-t_0)^2}{2} + \tag{7}$$
$$T_p\frac{\cos(\omega t) - \cos(\omega t_0)}{\omega^2} + T_p\frac{\sin(\omega t_0)}{\omega}(t-t_0) +$$
$$kx(t_0)\frac{(t-t_0)^2}{2} + K\dot{x}(t_0)\frac{(t-t_0)^3}{6} + c\dot{x}(t_0)\frac{(t-t_0)^2}{2}$$

$$\theta_p(t) = \theta_p(t_0) + \dot{\theta}_p(t_0)(t-t_0) \tag{8}$$

The formula (7) and the formula (8) are substituted into the formula (1) to obtain:

$$x(t) = x(t_0) + \dot{x}(t_0)(t-t_0) - \tag{9}$$
$$R_{bg}\left(\begin{array}{c}T_p\frac{\cos(\omega t) - \cos(\omega t_0)}{\omega^2} + T_p\frac{\cos(\omega t_0)}{\omega}(t-t_0) + \\ (kx(t_0) + c\dot{x}(t_0) - T_m)\frac{(t-t_0)^2}{2} + k\dot{x}(t_0)\frac{(t-t_0)^3}{6}\end{array}\right)$$

$$\dot{x}(t) = \dot{x}(t_0) - R_{bg}\left(\begin{array}{c}c(x(t)-x(t_0)) + k\left(x(t_0)(t-t_0) + \dot{x}(t_0)\frac{(t-t_0)^2}{2}\right) - \\ T_m(t-t_0) - T_p\frac{\sin(\omega t) - \sin(\omega t_0)}{\omega}\end{array}\right) \tag{10}$$

When $|x(t)|=L$, an elastic collision occurs to the gear system, and the dynamic equation of the system at this moment is:

$$x(t+\in_{\Delta t}) = x(t) \cdot \dot{x}(t+\in_{\Delta t}) = -e\dot{x}(t) \tag{11}$$

wherein, e is a collision coefficient, and a collision time constant $\in_{\Delta t}$ is an extremely small positive number. During collision, the transmission error may be represented as:

$$x(t_0+\Delta t_i) = L\,\text{sign}(\dot{x}(t_0)) \tag{12}$$

Here, $\Delta t_i = t_i - t_0$ is a collision time interval; if $\text{sign}(\dot{x}(t_0)) > 0$, it represents that the collision occurs to the front side of the gear tooth, at this moment, the driven wheel rotates under the driving of the driving wheel. If $\text{sign}(\dot{x}(t_0)) < 0$, it represents that the collision occurs on the lateral side of the gear tooth, at this moment, the driving wheel rotates under the driving of the driven wheel.

The formula (9) is combined with the formula (12) to obtain:

$$L\,\text{sign}(\dot{x}(t_0)) = \tag{13}$$
$$x(t_0) + \dot{x}(t_0)\Delta t_i - R_{bg}\left(\begin{array}{c}T_p\frac{\cos(\omega t) - \cos(\omega t_0)}{\omega^2} + T_p\frac{\sin(\omega t_0)}{\omega}\Delta t_i + \\ (kx(t_0) + c\dot{x}(t_0) - T_m)\frac{\Delta t_i^2}{2} + k\dot{x}(t_0)\frac{\Delta t_i^3}{6}\end{array}\right)$$

A second-order Taylor expansion is conducted near the small quantity of $\Delta t_i$ on left and right sides of the formula (13) at the same time, and an infinitely small quantity having an order higher than $\Delta t_i^2$ is ignored, to obtain:

$$L\,\text{sign}(\dot{x}(t_0)) \approx \tag{14}$$
$$x(t_0) + \dot{x}(t_0)\Delta t_i - \frac{R_{bg}}{2}(kx(t_0) + c\dot{x}(t_0) - T_m - T_p\cos(\omega t_0))\Delta t_i^2$$

The following may be determined according to the above formula:

$$\Delta t_i = \frac{-b \pm \sqrt{b^2 - 4ac}}{2a} \tag{15}$$

wherein, $a=(R_{bg}T_m+R_{bg}T_p\cos(\omega t_0)-R_{bg}kx(t_0)-R_{bg}c\dot{x}(t_0))/2$, $b=\dot{x}(t_0)$ and $c=x(t_0)-L\,\text{sign}(\dot{x}(t_0))$. Only a minimal positive real value of $\Delta t_i$ is taken according to a physical significance. If $\Delta t_i$ has no minimal positive real value, it is deemed that $\Delta t < \Delta t_i$.

Figure 7:
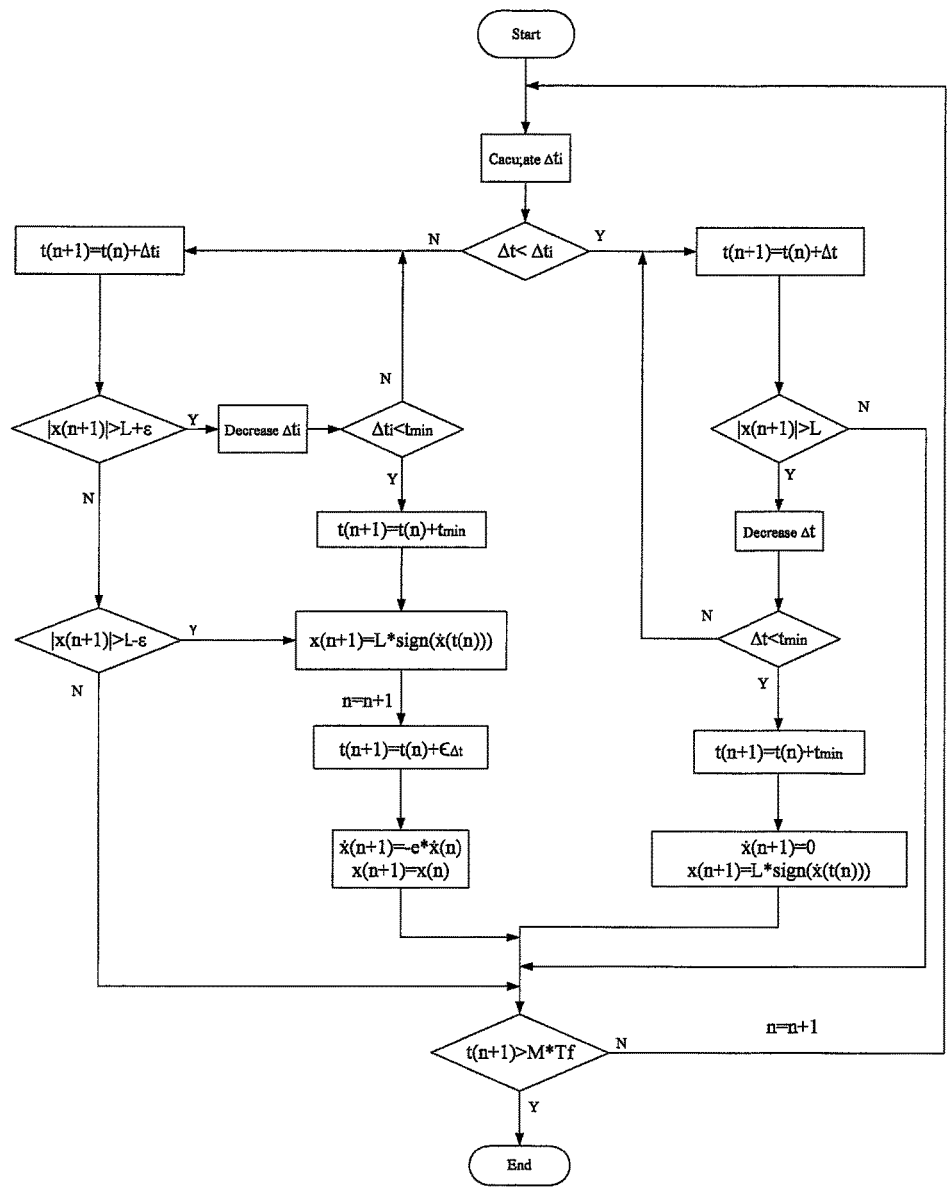
FIG. 7 is a flow chart of a determination method of the present invention.

As shown in FIG. 7, $\Delta t_i$ is compared with $\Delta t$ to determine next time-step, if $\Delta t < \Delta t_i$, then the relative displacement $x(n+1)$ is calculated by the time-step $\Delta t$. If $|x(n+1)| < L$, the time $\Delta t_i$ of the next moment is calculated. If $|x(n+1)| > L$, it indicates that the relative displacement is greater than the gear backlash, and the time-step $\Delta t$ shall be reduced according to formula $$\Delta t = \Delta t - \Delta t^2 \tag{16}$$

Figure 4:
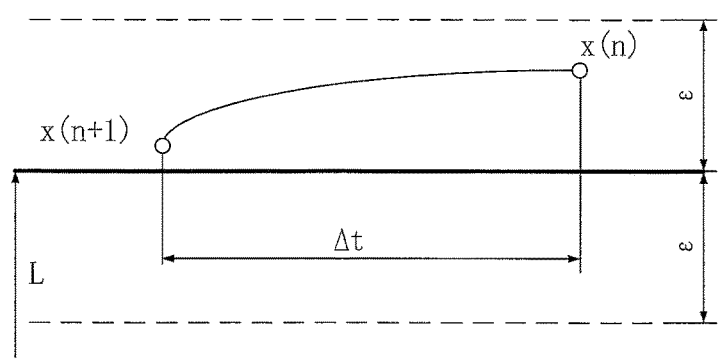
FIG. 4 is a schematic diagram of a judgment situation when the driving wheel is adhered to and linked with the driven wheel of the present invention.

If the shortened time-step is greater than the minimum time-step $t_{min}$ set by the system according to the formula (16), then the relative displacement $x(n+1)$ is recalculated. Otherwise, the minimum time-step $t_{min}$ is taken as a step by the system to calculate the relative displacement $x(n+1)$. At this moment, the large gear and the pinion gear of the system are adhered and linked (as shown in FIG. 4). At this moment, it may be defined according to the physical significance thereof as follows:

$$x(n+1) = L\,\text{sign}(\dot{x})(t(n)))\cdot\dot{x}(n+1) = 0 \tag{17}$$

Figure 5:
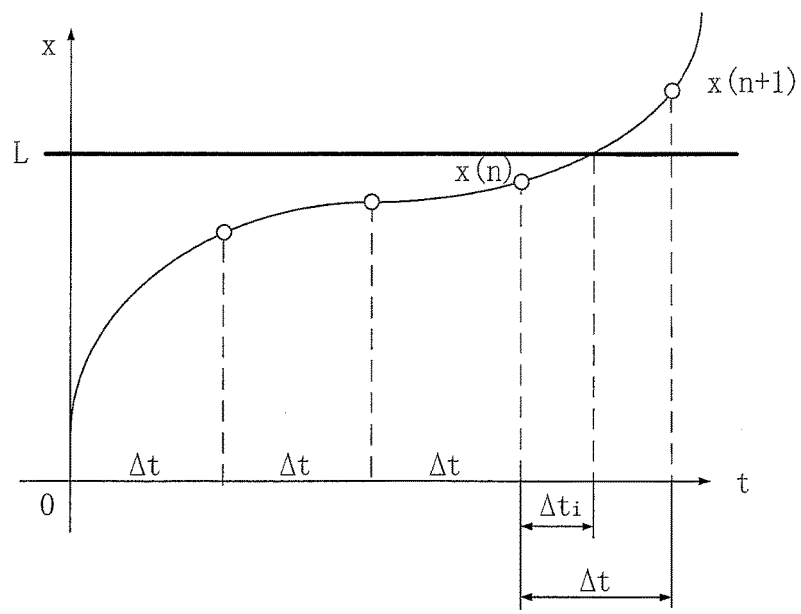
FIG. 5 is a schematic diagram of a situation when $\Delta t \geq \Delta t_i$ during collision between teeth of the present invention.
Figure 6:
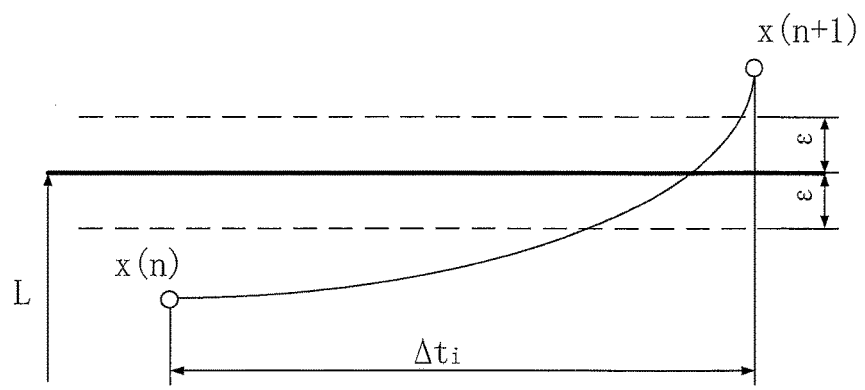
FIG. 6 is a schematic diagram of a situation of using ε to make the collision between gear teeth precise again according to the present invention.

If $\Delta t \geq \Delta t_i$ (as shown in FIG. 5), then $\Delta t_i$ is served as the next step to calculate a next relative displacement and velocity. Similarly, $x(n+1)$ needs to be judged, if $|x(n+1)| > L + \varepsilon$, it proves that the relative displacement $x(n+1)$ herein goes beyond an accuracy range, as shown in FIG. 6, and $\Delta t_i$ needs to be decreased here, so as to guarantee the accuracy within an allowable error range, and a formula of decreasing $\Delta t_i$ as as follows:

$$\Delta t_i = \Delta t_i - \Delta t_i^2 \tag{18}$$

$\Delta t_i$ in the formula (18) is the step, to recalculate $x(n+1)$ and $\dot{x}(n+1)$. if $|x(n+1)| > L + \varepsilon$ at this moment, the formula (18) is repeated until $\Delta t_i < t_{min}$, then $t_{min}$ is taken as a step by the system to calculate the relative displacement and the relative velocity. At this moment, a collision occurs to the system, and according to the actual physical significance of collision, set:

$$x(n+1)=L\ \text{sign}(\dot{x}(t(n)))' \quad (19)$$

In order to guarantee that the relative displacement values of the system before and after collision are equal, a small quantity of time is introduced herein, i.e., a collision time constant $\in_{\Delta t}$, so that $\in_{\Delta t}$ is taken as a step by the system, i.e.,:

$$t(n+1)=t(n)+\in_{\Delta t} \quad (20)$$

The relative displacement and the relative velocity are recalculated, and the relative displacement and relative velocity after the collision are as follows:

$$\dot{x}(n+1)=-e\dot{x}(n),\ x(n+1)=x(n) \quad (21)$$

If the formula $|x(n+1)|>L+\varepsilon$ is not satisfied, but $|x(n+1)|>L-\varepsilon$ is satisfied, a collision occurs to the system, and formulas (19), (20), and (21) are repeated at this moment.

If neither $|x(n+1)|>L+\varepsilon$ nor $|x(n+1)|>L-\varepsilon$ is satisfied, it illustrates that no collision occurs to the system, and the displacement and the velocity are recalculated at this moment.

Through continuous circulation in such a way, a large number of $x(n+1)$, $\dot{x}(n+1)$, $t(n+1)$ and other data may be recorded. During the entire course of operation, if $t(n+1)<M*T_f$, then the relative displacement and relative velocity obtained are substituted into the formula (15) to recalculate $\Delta t_i$. If $t(n+1)>M*T_f$, then the operation is stopped, thus being capable of obtaining the relative displacement (transmission error), the relative velocity (velocity of transmission error) and the time data of M periods. M is a number of the period of the excitation, $T_f$ is a period of the excitation, and the excitation is provided by the magnetic powder brake.

In conclusion, according to the method for determining dynamic transmission error of gear of the present invention, the collision time interval is calculated via the parameter values such as the angular velocity of the input shaft 3 measured by the angle coder 4, the drag torque of the output shaft 6 provided by the magnetic powder brake 7, the gear backlash, and angular displacements of the input shaft 3 and the output shaft 6; and the relative displacement obtained is compared with the gear backlash, until the value of the relative displacement falls within an appropriate interval and meets requirements, the result obtained being namely the transmission error with relatively high accuracy. By considering the influence of the gear backlash on the transmission error, the accuracy of a transmission error determination result is guaranteed, meanwhile, the accuracy and time are also well balanced, and the method is applicable to the measurement, calculation and analogue simulation calculation of an actual gear set.

The specific embodiments described herein merely illustrate the spirit of the present invention. Those killed in the art may figure out various modifications or supplements or replacements in a similar mode on the specific embodiments described without departing from the spirit of the invention or going beyond the scope defined by the claims appended.

Although such terms as relative displacement and collision time interval are frequently used herein, this does not exclude the possibility of using other terms. These terms are merely used for describing and explaining the essence of the present invention more conveniently; and explaining the terms into any additional limitation departs from the spirit of the present invention.

The invention claimed is:

1. A method for determining dynamic transmission error of gear, comprising:
   A. obtaining parameter values, the parameter values comprising an angular velocity of an input shaft measured by an angle coder and a drag torque of an output shaft provided by a magnetic powder brake, wherein the drag torque is $T_g = T_m + T_p \cos(\omega t)$;
   B. calculating a collision time interval $\Delta t_i$ between two gear teeth;
   C. comparing the collision time interval $\Delta t_i$ with a time-step $\Delta t$, and performing step D if $\Delta t$ is less than $\Delta t_i$; and performing step G if $\Delta t$ is greater than or equal to $\Delta t_i$,
   D. calculating a relative displacement of the gear $x(n+1)$ by taking the time-step $\Delta t$ as a step $\Delta t$. if an absolute value $|x(n+1)|$ of the relative displacement $x(n+1)$ is less than or equal to a gear backlash L, performing step J; and if the absolute value $|x(n+1)|$ of the relative displacement $x(n+1)$ is greater than the gear backlash L, decreasing the time-step $\Delta t$ and then performing step E;
   E. comparing the time-step $\Delta t$ with a minimum time-step $t_{min}$, performing step D if the time-step $\Delta t$ is greater than or equal to the minimum time length $t_{min}$; and performing step F if the time-step $\Delta t$ is less than the minimum time-step $t_{min}$;
   F. calculating a relative displacement $x(n+1)=L\ \text{sign}(\dot{x}(t(n)))$ by taking the minimum time-step $t_{min}$ as a step, $\dot{x}(n+1)=0$, and then performing step J;
   G. calculating the relative displacement $x(n+1)$ by taking the collision time interval $\Delta t_i$ as the step, if an absolute value $|x(n+1)|$ of the relative displacement $x(n+1)$ is less than or equal to $L-\varepsilon$, performing step J; if the absolute value $|x(n+1)|$ of the relative displacement $x(n+1)$ is less than or equal to $L+\varepsilon$ and the absolute value $|x(n+1)|$ of the relative displacement $x(n+1)$ is greater than $L-\varepsilon$, performing step I; and if the absolute value $|x(n+1)|$ of the relative displacement is greater than $L+\varepsilon$, decreasing the collision time interval $\Delta t_i$, and then performing step H;
   H. comparing the collision time interval $\Delta t_i$ with the minimum time-step $t_{min}$, if the collision time interval $\Delta t_i$ is greater than or equal to the minimum time-step, returning to step G; if the collision time interval $\Delta t_i$ is less than the minimum time-step $t_{min}$, taking the minimum time-step as the step $t(n+1)=t(n)+t_{min}$, and then performing step I;
   I. calculating the relative displacement $x(n+1)=L\ \text{sign}(\dot{x}(t(n)))$, increasing the number of the step n by 1, then taking a collision time constant $\in_{\Delta t}$ as a step $t(n+1)=t(n)+\in_{\Delta t}$, calculating a relative velocity as: $\dot{x}(n+1)=-e\dot{x}(n)$, calculating the relative displacement as: $x(n+1)=x(n)$, and then performing step J; and
   J. judging whether $t(n+1)$ is greater than $M \times T_f$, if yes, finishing calculation, and if not, increasing the number of step n by 1 and then returning to step B;
   $\varepsilon$ being a minimum error, M being a number of the period, $T_f$ being a period of the excitation, $t(n)$ being a $t(n)^{(th)}$ time sampling point, and $x(n)$ being an $n^{(th)}$ relative displacement.

2. The method for determining dynamic transmission error of gear according to claim 1, wherein calculation of the collision time interval in step B is performed as follows:

$$\Delta t_i = \frac{-b \pm \sqrt{b^2 - 4ac}}{2a},$$

wherein, $a=(R_{bg}T_m+R_{bg}T_p \cos(\omega t_0)-R_{bg}kx(t_0)-R_{bg}c\dot{x}(t_0))/2$, $b=\dot{x}(t_0)$, $c=x(t_0)-L \text{ sign}(\dot{x}(t_0))$, $\Delta t_i$ is a minimum positive real value of two values, $R_{bg}$ is a base radius of a driven wheel, $R_{bp}$ is a base radius of a driving wheel, $T_m$ is a ratio of a mean value of an external load moment and a rotational inertia of the driven wheel, $T_p$ is a ratio of a fluctuation portion of the external load moment and the rotational inertia of the driven wheel, $\omega$ is a frequency of the external load moment, $t_0$ is an initial system time, k is a ratio of meshing stiffness of contacted front and side of a gear pair caused by an oil film and the rotational inertia of the driven wheel, and c is a ratio of meshing damping of the contacted front and side of the gear pair caused by the oil film and the rotational inertia of the driven wheel.

3. The method for determining dynamic transmission error of gear according to claim 1, directly performing step G if $\Delta t_i$ has no positive real value while calculating the collision time interval $\Delta t_i$.

4. The method for determining dynamic transmission error of gear according to claim 1, wherein a specific operation of decreasing the time-step in step D decreases $\Delta t^2$ from $\Delta t$.

5. The method for determining dynamic transmission error of gear according to claim 1, wherein a specific operation of decreasing the collision time interval in step D decreases $\Delta t_i^2$ from $\Delta t_i \Delta t_i^2$.

* * * * *